US005496635A

United States Patent [19]

Francis et al.

[11] Patent Number: 5,496,635
[45] Date of Patent: Mar. 5, 1996

[54] DIRECTLY PRINTABLE COATING FOR OLEFINIC POLYMER FILMS AND ARTICLES UTILIZING SUCH COATING

[75] Inventors: Robert C. Francis, Maplewood, Minn.; Robert R. L. Smolders, Antwerp, Belgium; William G. Walsh, Cloughabrody, Ireland; Ramesh C. Kumar, Maplewood, Minn.

[73] Assignee: Minnesota Mining and Manufacturing Company, St. Paul, Minn.

[21] Appl. No.: 204,001

[22] Filed: Mar. 1, 1994

Related U.S. Application Data

[63] Continuation-in-part of Ser. No. 134,333, Oct. 12, 1993, abandoned.

[51] Int. Cl.[6] ............................................. C09J 7/02
[52] U.S. Cl. ........................... 428/352; 428/354; 428/447
[58] Field of Search ........................... 428/446, 447, 428/195, 424.8, 334, 343, 354, 352; 525/288, 293, 296

[56] References Cited

U.S. PATENT DOCUMENTS

| | | | |
|---|---|---|---|
| Re. 31,727 | 11/1984 | Eckberg | 428/429 |
| 3,676,391 | 7/1972 | DeRoss | 260/33.6 UA |
| 4,070,523 | 1/1978 | Blum et al. | 428/352 |
| 4,238,393 | 12/1980 | Takamizawa et al. | 260/22 S |
| 4,486,559 | 12/1984 | Murata et al. | 523/468 |
| 4,587,156 | 5/1986 | Wu | 428/207 |
| 4,599,260 | 7/1986 | Truskolaski et al. | 428/207 |
| 4,708,907 | 11/1987 | Flutti et al. | 428/352 |
| 4,728,571 | 3/1988 | Clemens et al. | 428/352 |
| 4,783,490 | 11/1988 | Eckberg et al. | 522/99 |
| 4,795,785 | 1/1989 | Ito et al. | 525/288 |
| 4,847,319 | 7/1989 | Bandlish | 524/589 |
| 5,032,460 | 7/1991 | Kantner et al. | 428/449 |
| 5,057,619 | 10/1991 | Kumar et al. | 556/420 |
| 5,059,648 | 10/1991 | Fukushima et al. | 524/376 |
| 5,082,915 | 1/1992 | Hara et al. | 528/15 |
| 5,089,336 | 2/1992 | Kumar et al. | 428/352 |
| 5,154,962 | 10/1992 | Mertens et al. | 428/40 |
| 5,168,002 | 12/1992 | Maietti | 428/352 |
| 5,200,436 | 4/1993 | Kumar et al. | 522/57 |
| 5,235,004 | 9/1993 | Kobayashi et al. | 525/477 |

FOREIGN PATENT DOCUMENTS

| | | | |
|---|---|---|---|
| 0478277A2 | 1/1992 | European Pat. Off. | C09J 7/04 |
| 0517379A1 | 9/1992 | European Pat. Off. | C09D 4/06 |
| WO92/16593 | 3/1991 | WIPO | |
| WO92/16590 | 3/1991 | WIPO | |

OTHER PUBLICATIONS

Yoshiyuki Ikeda and Kozo Misumi, *Kokubunshi Ronbunshu*, vol. 50, No. 2, pp. 127–130 (Feb., 1993), "Graft Polymerization of Silicone Macromer onto Chlorinated Polyethylene Having Acrylic Acid Pendants".

*Primary Examiner*—Jemma L. Davis
*Attorney, Agent, or Firm*—Gary L. Griswold; Walter N. Kirn; James V. Lilly

[57] ABSTRACT

A directly printable composition is provided. The composition is the reaction product of a vinyl-functional monomer, a chlorinated olefinic resin, optionally an amide-functional monomer, and optionally a free radically polymerizable silicone-containing material. The reaction product is stable and can be applied to a variety of substrates. A variety of inks can be directly printed on the coating.

12 Claims, No Drawings

DIRECTLY PRINTABLE COATING FOR OLEFINIC POLYMER FILMS AND ARTICLES UTILIZING SUCH COATING

CROSS REFERENCE TO RELATED APPLICATION

This is a continuation-in-part of U.S. patent application Ser. No. 08/134,333 filed Oct. 12, 1993, now abandoned.

FIELD OF THE INVENTION

The present invention relates to a directly printable coating for olefinic polymer films and to articles which employ such coatings.

BACKGROUND OF THE INVENTION

Polymer films are often printed to display product identification, advertisement, warning, decoration, or other information. Various techniques can be used to print on the film, such as screenprinting, letterpress, offset, flexographic printing, stipple printing, laser printing, and so forth. Additionally, various types of ink can be printed. These include one and two component inks, oxidatively drying and UV-drying inks, dissolved inks, dispersed inks, and 100% ink systems.

While it may seem that many combinations of printing techniques and inks are possible, in practice, each particular type of film is printed by means of a limited number of specific printing ink/print technique combinations. For example, polyvinyl chloride (PVC) film, often used as a backing for adhesive articles, is usually directly printed using flexographic or gravure techniques and vinyl-based inks. PVC film is a desirable backing for many applications because of its durability, chemical resistance, mechanical properties, and printability. However, there are also many disadvantages to using PVC film as a backing. For example, PVC often contains high levels of plasticizer and heavy metal heat stabilizers. Additionally, PVC releases hydrochloric acid upon aging and combustion, and it may form significant quantities of dioxines under certain conditions. Due to the environmental and health concerns resulting from these features of PVC film, it is gradually being replaced by polyolefin films such as polypropylene.

For many applications, such as for the manufacture of printed adhesive tape, it is desirable to directly substitute a polyolefin film for PVC film and print the polyolefin film with the same inks as previously used. However, it has been discovered that polypropylene materials usually cannot be simply substituted for PVC. For example, while PVC film can easily be directly printed, it is more difficult to directly print onto a polyolefin film.

For many adhesive tape printing applications it is further desirable that the tape be capable of being unwound at high speed without producing a level of noise which may damage the heating of the operators using the tape, either in a printing or use step. Consequently, when replacing PVC film with polyolefin film as the backing, it is desirable to duplicate both the quiet unwind and printable characteristics of the PVC film.

Several coatings have been disclosed which are said to provide a printable and/or low noise olefinic polymer film. For example, U.S. Pat. No. 3,676,391 discloses a coating composition for priming untreated polyolefin substrates which comprises a resin of chlorinated polyolefin and ethylene/vinyl acetate copolymer. This patent further discloses a backsize for pressure sensitive adhesive tape which is a blend of cellulose acetate butyrate and copolyester and/or acrylate copolymer. The backsize is said to be both printable and more easily unwound. U.S. Pat. No. 4,070,523 discloses a printable release coating for flexible pressure sensitive tape which incorporates polyketone resins blended with a release agent and an elastomeric or resinous film. U.S. Pat. No. 4,587,156 discloses a directly printable backsize coating composition for PSA tape comprising a ternary mixture of a low adhesion backsize compound, an ink anchoring resin, and a primer resin wherein the surface free energy of the ink anchoring resin and the primer are within about ten percent of the surface free energy of the low adhesion backsize compound. U.S. Pat. No. 4,599,260 discloses a directly printable tape having a backsize coating comprising a mixture of a low adhesion backsize compound, such as a polyvinyl carbamate polymer, and an ink adhesion promoter, such as a chlorinated polyolefin. Also disclosed is an ink composition comprising a conventional flexographic ink composition in conjunction with an effective amount of a chlorinated polyolefin.

U.S. Pat. No. 4,708,907 discloses a writable adhesive tape having a polyolefin substrate, an adhesive layer on one side of the substrate, and a writable anti-adhesive layer on the opposite side. The anti-adhesive layer comprises a blend of 25–55% by weight of a chlorinated polyolefin, 20–50% of a polyaldehyde resin, 5–20% of an anti-adhesive agent, and 5–25% of a matting charge.

U.S. Pat. No. 5,168,002 discloses a pressure sensitive self-adhesive tape including an olefinic polymer substrate, a pressure sensitive adhesive on one face of the substrate, and a non-stick layer on the opposite face. The non-stick layer is composed of a blend of a chlorinated olefinic resin, an acrylic resin, and a non-stick agent. Similarly, a blend of a chlorinated olefinic resin and an acrylic resin has been used commercially on polypropylene backing in the manufacture of a low noise directly printable adhesive packaging tape. While both coatings provide olefinic films with the low noise and printability desired in a PVC replacement, the blends tend to phase separate with time, especially at higher levels of the chlorinated olefinic resin, and require additional precautions to prevent the formation of an inhomogeneous coating. Such inhomogeneous coatings exhibit reduced printability and increased unwind release values.

SUMMARY OF THE INVENTION

It has been discovered that by reacting appropriate vinyl-functional monomers in the presence of a chlorinated olefinic resin, a homogeneous reaction product is obtained. This reaction product gives a smooth, stable coating having improved printability and ink anchorage. The composition of the invention does not phase separate when stored at room temperature and, when applied to polymeric films, does not adversely affect the unwind characteristics of the tape. The reaction product of the invention also improves the processability of film articles which employ it. Such films have a reduced tendency to break during processing. The coating of the invention is directly printable. Thus, when present on a substrate, it may be directly printed on by various commercial inks without the need to employ a primer to promote adhesion of the inks to the coating or a top coat over the ink.

In accordance with the present invention there is provided a reaction product of a vinyl-functional monomer and a chlorinated olefinic resin. In an alternative preferred aspect of the invention an amide-functional monomer and/or a silicone-containing component is utilized in the reaction. Preferably the reaction products of the invention have an inherent viscosity (IV) of 0.1 to 0.3, preferably from 0.15 to 0.18 at 0.5 g/dL when measured in tetrahydrofuran at 27° C.

The compositions of the invention may be utilized on a variety of substrates. Examples of useful substrates include oriented and unoriented polymeric films such as polyolefins (e.g. polyethylene and polypropylene), polyester (e.g., poly- (ethylene terephthalate), polyimide, polyamide, etc.). It is preferred that the polymeric film be oriented, either uniaxially or biaxially in order to improve its strength.

As used herein, the term "reaction product" refers to the product resulting from the chemical interaction of the components used, i.e., the vinylfunctional monomer, the chlorinated olefinic resin and optionally, the amide-functional monomer and the silicone-containing material. It is believed that the reaction product comprises a copolymer of the various components, either as a random copolymer, a graft copolymer, or a block copolymer.

DETAILED DESCRIPTION OF THE INVENTION

In one aspect, the present invention comprises the reaction product of a vinyl-functional monomer, a chlorinated olefinic resin and optionally either an amide-functional monomer, a silicone-containing component, or both. Various other ingredients such as fillers, colorants, antioxidants, ultra violet light stabilizers and the like may also be included with the reaction product of the invention.

The vinyl-functional monomer useful in this aspect of the invention comprises a non-thermosetting, vinyl-functional material. The vinyl-functional monomers useful in the invention include comprise the acrylic and methacrylic acid esters of an alcohol. The alcohol has from 1 to 14 carbon atoms, preferably from 4 to 12 carbon atoms. Examples of such vinyl-functional monomers include methyl acrylate and methacrylate, isobutyl acrylate and methacrylate, isooctyl methacrylate, isobornyl acrylate and methacrylate, isononyl acrylate and methacrylate, 2-ethyl-hexylmethacrylate, decyl acrylate and methacrylate, dodecyl acrylate and methacrylate, n-butyl acrylate and methacrylate, t-butyl acrylate and methacrylate, and hexyl acrylate and methacrylate.

In another aspect, the present invention comprises a directly printable film. The film comprises a polymeric substrate which has a coating that comprises the reaction product of a vinyl-functional monomer and a chlorinated olefinic resin on at least one of its surfaces. The vinyl-functional monomer useful in this aspect of the invention comprises a nonthermosetting material. It can be acrylic or methacrylic acid, a styrene-based monomer, or the acrylic or methacrylic acid esters described above.

The vinyl-functional monomer may be used individually or in combination with other such monomers in the practice of the invention. The vinyl-functional monomer typically comprises from 50 to 95 weight percent of the materials which are reacted to form the reaction product. Preferably the vinyl-functional monomer comprises from 70 to 90 weight percent of those materials.

The vinyl-functional monomer may be combined with waxy coreactive materials if desired. However, care must be taken to limit the quantity of these coreactive materials employed so that there is no substantial loss of ink adhesion. Preferably, a combination of two or more vinyl-functional materials are employed when a waxy coreactive component is to be used.

The chlorinated olefinic resin useful in the invention typically has a chlorine content of from 15 to 55%, preferably from 20 to 45%. Examples of such materials include chlorinated polyethylene, chlorinated polybutylene, chlorinated polypropylene, etc. These materials may be used individually or in combination with each other.

Representative examples of commercially available chlorinated polyolefins include Eastman™ CP-343-1 available from Eastman Chemical Products, Inc. and Tramaco Trapylen™ 814 HS from Tramaco. Eastman™ CP-343-1 is believed to have a chlorine content of 22% and is reported to have a softening point of 80°–95° C. Tramaco Trapylen™ 814 HS is believed to have a chlorine content of 43% and is reported to have a softening point of about 70° C.

The chlorinated olefinic resin typically comprises from 5 to 50 weight percent of the materials used to prepare the reaction product. Preferably it comprises from 5 to 20 percent by weight.

Other materials may also be used in the preparation of the composition of the invention. For example, an amide-functional monomer may be employed. These monomers are copolymerizable with the vinyl-functional monomer and are generally considered to be strongly polar. Such materials include the acrylamides and substituted acrylamides. Specific examples of these monomers include acrylamide, methacrylamide, and N,N-dimethyl acrylamide. The amide-functional monomer typically comprises from about 5 to 30 percent by weight of the materials used to form the reaction product. Preferably, it comprises from 2 to 10 percent by weight.

The composition of the invention may also contain a silicone-containing component. This component may be used whether or not the amide-type material is employed. Silicone-containing components useful in the invention are free radically polymerizable siloxane-containing materials, i.e., those which contain the units

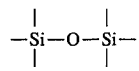

A wide variety of such materials are useful in the invention. For example, one useful silicone-containing material is disclosed in U.S. Pat. No. 4,728,571 to Clemens et al. This patent discloses a copolymer of A, B and C monomers, wherein A is at least one free radically polymerizable vinyl monomer: B is at least one polar monomer copolymerizable with A, the amount of B being up to 30% of the total weight of all monomers, and C is a monomer having the general formula $X-(Y)_n-SiR_{(3-m)}Z_m$ wherein X is a vinyl group copolymerizable with the A and B monomers; Y is a divalent linking group where n is zero or 1; m is an integer of from 1 to 3; R is hydrogen, lower alkyl (e.g., methyl, ethyl, or propyl), aryl (e.g., phenyl or substituted phenyl), or alkoxy; and Z is a monovalent siloxane polymeric moiety having a number average molecular weight above about 1,000 and is essentially unreactive under copolymerization conditions. The A and B monomers are copolymerized to form a polymeric backbone to which the C monomer is grafted, the amount and composition of the C monomer (about 0.01–20% of total monomer weight, the C monomer having a molecular weight of 1,000–50,000 being chosen such that the surface release value of the composition does not exceed about 50 N/dm. U.S. Pat. No. 5,154,962 to Mertens et al discloses a variation of the siloxane-containing polymer of Clemens et al which is also useful in the invention. In the patent, the amount of the B monomer is controlled so that the copolymer has a hydrated Tg between −15° C. and 35° C., and the temperature difference between the hydrated Tg and the actual Tg is at least 20° C. U.S. Pat. Nos. 5,057,619 and 5,200,436 to Kumar et al (polymerization of vinyl monomer with siloxane iniferter to yield ABA or AB type block copolymers) and 5,089,336 (iniferter prepared vinyl-siloxane block copolymer. Still other useful silicone-containing materials useful in the present invention are disclosed in U.S. Pat. Nos. 4,238,393 and 4,783,490; (mercapto-functional siloxanes). U.S. Pat. No. 5,032,460 to Kantner et al discloses yet another vinyl-silicone copolymer useful in the invention. This polymer employs a mercapto functional silicone chain transfer agent.

A number of commercially available silicone-containing materials are also useful in the invention. Suppliers of these materials include Shin-Etsu Silicones of America, Inc., the General Electric Company, and the Dow Corning Corporation.

The level of the silicone-containing component that can be used in the practice of the invention varies with the other reactants used. Moreover, it can be varied to suit the users needs. However, it is pointed out that generally as the level of the silicone-containing material increases, the level of ink adhesion drops. Additionally, as the amount of silicone-containing material increases, the level of force necessary to unwind a roll of the adhesive tape of the invention decreases. However, if the force becomes too low, it becomes difficult to handle the tape. It also becomes difficult to prevent the individual wraps of the roll from telescoping. Additionally, it has been found that the unwind characteristics of the tape become more raspy (or jerky) as the unwind force is reduced. Consequently, the silicone-containing component is typically present at a level of from 0.01 to 5 percent by weight of the materials used to prepare the reaction product. Preferably, the silicone-containing material is present at a level of from 0.1 to 2 percent by weight and more preferably at a level of from 0.1 to 0.5 percent by weight.

The exact silicone-containing material selected for use in the invention is not critical. It may be chosen to provide a reaction product that has main chain or terminal siloxane moieties. The main chain siloxane moieties may be either present as backbone moieties or as moieties pendent from the backbone. Preferably, the reaction product has main chain siloxane moieties. More preferably, these siloxane materials either have functional groups pendent from the main chain siloxane moieties or they are terminated by a functional group. When terminated by a functional group, the reaction product has an average functionality of less than 2 and preferably about 1.

Adhesives useful in the preparation of an adhesive tape according to the present invention include pressure sensitive and non-pressure sensitive adhesives. The former category is a preferred class of adhesives for use in the invention. They are normally tacky at room temperature and can be adhered to a surface by application of, at most, light finger pressure. The latter class of adhesives include solvent, heat or radiation activated adhesive systems.

The adhesives useful in the invention may generally be based on general compositions of polyacrylate; polyvinyl ether; diene-containing rubber such as natural rubber, polyisoprene, and polyisobutylene; polychloroprene; butyl rubber; butadiene-acrylonitrile polymer, thermoplastic elastomer, block copolymers such as the styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, curatives, and solvents.

A general description of useful pressure-sensitive adhesives may be found in *Encyclopedia of Polymer Science and Engineering*, Vol. 13, Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Other pressure-sensitive adhesives useful in the invention are described in the patent literature. Examples of these patents include Re 24,906 (Ulrich), U.S. Pat. No. 3,389,827 (Abere et al at Col. 4-Col. 5), U.S. Pat. No. 4,080,348 (Korpman), U.S. Pat. No. 4,136,071 (Korpman), U.S. Pat. No. 4,792,584 (Shiraki et al), U.S. Pat. No. 4,883,179 (Young et al), and U.S. Pat. No. 4,952,650 (Young et al).

Commercially available adhesives are also useful in the invention. Examples of these adhesives include the hot melt pressure-sensitive adhesives available from H. B. Fuller Company, St. Paul, Minn. as HM-1597, HL-2207-X, HL-2115X, HL-2193-X. Other useful commercially available pressure-sensitive adhesives include those available from Century Adhesives Corporation, Columbus, Ohio.

The coating of the present invention is particularly useful when applied as a backside coating on a tape which uses a natural rubber-based pressure sensitive adhesive. In this construction the substrate is located between the coating layer and the adhesive layer.

The coating of the present invention can be directly printed with a variety of inks. For example, inks which are normally used to print polyvinylchloride and polypropylene have been successfully directly printed on the coating of the invention. Examples of commercially available inks which can be printed on the coating of the invention include Flexodruck™ 80EH050 Schwartz (black) from Gebhard Schmidt Gmbh of Frankfurt, Germany, Flexotuf™ Green, F82306 from Sun Chemical Corp. of St. Paul, Minn., and Rubine Red, AW-12253 from INX, Inc. of Appleton, Wis.

The present invention is further illustrated in the following examples in which all quantities are in parts by weight unless otherwise noted. In these examples, the following abbreviations are used:

Polymer Type
B=Physical Blend
C=Reaction Product
Raw Material
IBMA=Isobutylmethacrylate
ACM=Acrylamide
DMACM=Dimethylacrylamide
IOBMA=Isobornylmethacrylate
CPO1=Eastman™ CP-343-1
CPO2=Tramaco Trapylen™ 814 HS
S1=Shin-Etsu™ KF2001 Siloxane
S2=Siloxane macromer prepared according to U.S. Pat. No. 5,057,619.
Substrate
PET/T=Poly(ethylene terephthalate) primed with animated polybutadiene
BOPP/C=Corona treated biaxially oriented polypropylene
BOPP/F=Flame treated biaxially oriented polypropylene
Ink
PVC=Flexodruck™ 80EH050-EVP Schwartz (black) from Gebhard Schmidt Gmbh, Frankfurt, Germany
PP=Flexotuf™ Green, F82306 from Sun Chemical Corp., St. Paul, Minn.
WB=Rubine Red, AW-12253 from INX Inc., Appleton, Wis.
Test Tape
M316=Monta™ 316 adhesive tape available from Monta Klebebandwerke Gmbh (natural rubber pressure sensitive adhesive).
371=Highland™ 371 adhesive tape available from 3M Company, St. Paul, Minn. (block copolymer pressure sensitive adhesive).
373=Scotch™ 373 adhesive tape available from 3M Company, St. Paul, Minn. (block copolymer pressure sensitive adhesive).
A341=American™ 341 adhesive tape available from American Tape Co. (acrylic pressure sensitive adhesive).

Ink Anchorage Test

A test specimen (50×50 mm) was secured to a metal or glass coating bed. Using appropriate solvents, the viscosity of the ink to be applied was adjusted to 20–30 seconds, measured using a #2 Zahn cup. Using a hand-held proofing roller (Parmarico Standard), 1 ml of ink was applied to the film using moderate pressure in a pulling motion and holding the roller at an angle of 70°. The coated sample was removed from the coating bed, secured to a drying board and placed in an oven at 54° C. (130° F.) for 15 minutes.

The inked film sample was then hung in air to cool for at least 15 minutes, but no longer than 60 minutes. The inked test specimen was then placed on a firm base and a grid of lines was scribed into the ink layer. Care was taken not to cut the backing film itself. A total of 7 scribe lines, each 10 mm apart was scribed in each direction. The scribe lines intersected each other at an angle of 90°. Two laps of tape were removed from the test tape roll and discarded. A 100 mm length of tape was then cut off from the test tape roll and used to perform the test. The center portion of this length of tape was placed over the center of the grid pattern and then the tape was carefully laid over the entire grid pattern. The tape was smoothed in place using fingers or an eraser to assure good contact. Initial adhesion was determined by rapidly pulling the free end of the tape at an angle of 180° within 90–120 seconds of its application to the grid pattern. Aged adhesion was determined by conditioning the test assembly for 1 hr. at 54° C. (130° F.) before removing the test tape.

The grid pattern remaining was inspected and assigned a rating according to the following:

E—The edges of the cuts were completely smooth and none of the squares of the lattice was detached.

VG—Small flakes of the coating were detached at the intersections. Less than 5% of the area was affected.

G—Small flakes of the coating were detached along the edges and at the intersection of the cuts. The affected area was 5 to 15%.

P—The coating had flaked along the edges and on parts of the squares. The affected area was more than 15%.

Release Characteristics

The release characteristics between the adhesive and the directly printable coating were determined according to the following procedure. The test was run on a commercially available peel tester; the ZPE 1000 High Rate Peel Tester, INSTRUMENTORS Inc., 22077 Drake Road, Strongsville, Ohio, U.S.A.

The release characteristics measured were the backside release force (BRF), and the stick-slip index (SSI). The BRF represents the magnitude of the release force, whereas the SSI represents the smoothness or shockiness of the release.

A sample to be tested (35×400 mm) was cut from the film containing the coating to be tested. One end of the film was reinforced up to 15 mm from the end with a piece of masking tape folded over the end. This end was clamped in the load cell of the ZPE machine. Two wraps of 25 mm wide tape were removed from a roll of test tape and discarded. A piece of test tape 400 mm long was cut and laid down on the coated side of the film to be tested. The test tape was rolled down using a 2 kg (4.5 lb) roller twice in each direction for a total of four times. The ZPE machine was set to run in the alternate configuration as shown in FIG. 1B of the ZPE Instruction Manual. The reinforced end of the film sample was placed in the sample clamp of the load cell. The leader was attached to the tape sample and the leader was positioned in the nip roll. The peel rate was set to the specified value. The peel test was run according to the manufacturer's instructions. During data analysis, the test was fitted to a 5th order polynominal selecting the middle 80% of the test data and eliminating the initial and trailing 10%. A test report was generated showing a graphical representation of the release force, the calculated mean load, and the calculated RMS based on the raw data.

From the ZPE report the BRF and SSI were determined as follows:

BRF The backside release force was calculated by dividing the mean load by the width of the tape sample. The results were reported in newtons per cm (N/cm).

SSI The slip-stick index was calculated by multiplying the raw data RMS value by 53.5 and then dividing by the mean load value.

SSI is a dimensionless value and is an indication of the shockiness of the unwind. The higher the value the more shocky the unwind. In general, an SSI below 25 means a low noise smooth unwind, while a value above 75 means a noisy, raspy, shocky unwind. SSI values between 25 and 75 mean that the tape is becoming more noisy, raspy and shocky in unwind.

Initial results were obtained after exposure to the coatings to 23° C. (73 ° F.) for 1 day. Aged results were obtained after exposure of the coatings to 49° C. (120° F.) for 11 days. All BRF and SSI values were measured by pulling the test tape from the test specimen at a rate of 1.5 m/sec.

EXAMPLES 1–28 AND C1–C3

A reaction product according to the invention was prepared at 35–45% solids by weight in toluene. The vinyl-functional monomer, chlorinated olefinic resin, amide-functional monomer (if employed) and silicone-containing material (if employed) were added to a glass bottle. The toluene was then added to the bottle. The bottle was sealed and shaken for 20 minutes. After being shaken, the bottle was opened and 0.6% VAZO™ 64 (2,2'-azobisisobutyronitrile) and 0.6% IOTG (isooctylthioglycolate) per total weight of the vinyl-functional monomer, chlorinated olefinic resin, amide-functional monomer and silicone-containing material was added. The bottle was purged with nitrogen to provide an oxygen-free atmosphere in it and then resealed. The contents of the bottle were heated to 65° C. and reacted for 20 hours. The contents of the bottle were then cooled and diluted to 5–25 percent solids by weight by the addition of toluene. Lower solids content compositions were used to prepare lower coating weight samples. Higher solids content compositions were used to prepare higher coating weight samples. A portion of each of the resulting compositions was placed in separate containers and stored at room temperature. No visible separation was seen after one month of such storage. A separate portion of each of the resulting compositions was then applied to a desired polymeric substrate using a No. 6 Meyer bar. The coated substrate was dried at 49° C. (120° F.) for 10–15 minutes in an oven. The dried coating weights were 0.2 to 1.6 g/m². The resulting films were then tested for ink anchorage and release characteristics. Comparative Examples C1 and C2 employed simple physical blends of polyisobutylmethacrylate (poly IMBA) and CPO1. Comparative Example C3 employed the commercially available tape Monta™ 6893 PVC tape from Monta Klebebandwerke Gmbh. The compositions employed in each example and the test results for each example are reported in the Tables below.

TABLE 1

Comparison of Blends and Reaction Products Using M316 Test Tape

| Ex. | Composition | Film Type | Poly. Type | BRF Initial | BRF Aged | SSI Initial | SSI Aged | Ink Adhesion Initial | Ink Adhesion Aged | Time to Separation |
|---|---|---|---|---|---|---|---|---|---|---|
| C1 | Poly IBMA//CPO1 67//33 | PET/T | B | 4.8 | >6 | 2 | — | E | E | <1 day |
| C2 | Poly IBMA//CPO1 90//10 | PET/T | B | 4.3 | >6 | 3 | — | E | E | 3 days |
| 1 | IBMA/CPO1 67/33 | BOPP/F | C | 3.7 | 4.1 | 1 | 1 | E | E | |
| 2 | IBMA/ACM/CPO1 85/5/10 | PET/T | C | 3.7 | 4.6 | 1 | 1 | E | E | stable |
| 3 | IBMA/ACM/CPO/S1 84.8/5/10/0.2 | PET/T | C | 3.2 | 4.1 | 12 | 1 | E | E | stable |

TABLE 2

Comparison of Different Amides and Acrylates Using M316 Test Tape

| Ex. | Composition | Film Type | BRF Initial | BRF Aged | SSI Initial | SSI Aged | Ink Adhesion Initial | Ink Adhesion Aged |
|---|---|---|---|---|---|---|---|---|
| 3 | IBMA/ACM/CPO1 64/16/20 | PET/T | 3.5 | 4.0 | 1 | 1 | E | E |
| 4 | IBMA/DMACM/CPO1 65/15/20 | PET/T | 3.7 | 4.5 | 1 | 1 | E | — |
| 5 | IOBMA/ACM/CPO1 85/5/10 | PET/T | 4.1 | 4.8 | 2 | 1 | P | P |
| 6 | IBMA/IOBMA/ACM/CPO1 60/25/5/10 | PET/T | 4.1 | 4.8 | 1 | 1 | E | G |

TABLE 3

Comparison of CPO's Using M316 Test Tape

| Ex. | Composition | Film Type | BRF Initial | BRF Aged | SSI Initial | SSI Aged | Ink Adhesion Initial | Ink Adhesion Aged |
|---|---|---|---|---|---|---|---|---|
| 7 | IBMA/ACM/CPO1/S1 84.8/5/10/0.2 | PET/T | 3.1 | 4.4 | 22 | 1 | E | E |
| 8 | IBMA/ACM/CPO2/S1 84.8/5/10/0.2 | PET/T | 2.8 | 4.3 | 33 | 1 | E | E |

TABLE 4

| Ex. | Composition | Film Type | BRF Initial | BRF Aged | SSI Initial | SSI Aged | Ink Adhesion Initial | Ink Adhesion Aged |
|---|---|---|---|---|---|---|---|---|
| 9 | IBMA/ACM/CPO1/S1 84.8/5/10/0.2 | PET/T | 3.5 | 5.2 | 24 | 1 | E | E |
| 10 | IBMA/ACM/CPO1/S2 84.8/5/10/0.2 | PET/T | 3.4 | 4.3 | 4 | 1 | E | E |

TABLE 5

Effect of Coating Weight Using M316 Test Tape

| Ex. | Composition | Film Type | Ct. Wt. g/sqm. | BRF Initial | BRF Aged | SSI Initial | SSI Aged | Ink Adhesion Initial | Ink Adhesion Aged |
|---|---|---|---|---|---|---|---|---|---|
| 11 | IBMA/ACM/CPO1 85/5/10 | PET/T | 0.2 | 3.8 | 4.4 | 1 | 1 | P | — |
| 12 | IBMA/ACM/CPO1 85/5/10 | PET/T | 0.5 | 3.6 | 4.8 | 1 | 1 | P | — |
| 13 | IBMA/ACM/CPO1 85/5/10 | PET/T | 0.8 | 3.3 | 4.4 | 3 | 1 | E | — |

TABLE 5-continued

Effect of Coating Weight Using M316 Test Tape

| Ex. | Composition | Film Type | Ct. Wt. g/sqm. | BRF Initial | BRF Aged | SSI Initial | SSI Aged | Ink Adhesion Initial | Ink Adhesion Aged |
|---|---|---|---|---|---|---|---|---|---|
| 14 | IBMA/ACM/CPO1 85/5/10 | PET/T | 1.6 | 3.2 | 4.3 | 3 | 4 | E | — |

TABLE 6

Effect of Film Backing Using M316 Test Tape

| Ex. | Composition | Film Type | BRF Initial | BRF Aged | SSI Initial | SSI Aged | Ink Adhesion Initial | Ink Adhesion Aged |
|---|---|---|---|---|---|---|---|---|
| 15 | IBMA/ACM/CPO2/S1 84.8/5/10/0.2 | PET/T | transfer | transfer | transfer | transfer | E | E |
| 16 | IBMA/ACM/CPO1/S2 84.8/5/10/0.2 | PET/T | 3.5 | 5.2 | 26 | 1 | E | E |
| 17 | IBMA/ACM/CPO2/S1 84.8/5/10/0.2 | BOPP/C | 2.8 | 4.3 | 33 | 1 | E | E |
| 18 | IBMA/ACM/CPO2/S1 84.8/5/10/0.2 | BOPP/F | 2.7 | 3.9 | 26 | 2 | E | E |

TABLE 7

Effect of Silicone Content Using M316 Test Tape

| Ex. | Composition | Film Type | BRF Initial | BRF Aged | SSI Initial | SSI Aged | Ink Adhesion Initial | Ink Adhesion Aged |
|---|---|---|---|---|---|---|---|---|
| 19 | IBMA/ACM/CPO1/S2 84.8/5/10/0.2 | PET/T | 3.4 | 4.2 | 21 | 2 | E | — |
| 20 | IBMA/ACM/CPO1/S2 85/5/10/1 | PET/T | 1.7 | 4.1 | 87 | 1 | VG | |
| 21 | IBMA/ACM/CPO1/S2 85/5/10/2 | PET/T | 1.2 | 3.9 | 145 | 2 | E | |
| 22 | IBMA/ACM/CPO1/S2 81/5/10/4 | PET/T | 0.9 | 3.7 | 74 | 2 | E | |

TABLE 8

Effect of Adhesive Type

| Ex. | Composition | Film Type | Test Tape | BRF Initial | BRF Aged | SSI Initial | SSI Aged |
|---|---|---|---|---|---|---|---|
| 23 | IBMA/ACM/CPO1 85/5/10 | PET/T | M316 | 4.7 | — | 2 | — |
| 24 | IBMA/ACM/CPO1 85/5/10 | PET/T | 371 | 2.1 | — | 95 | — |
| 25 | IBMA/ACM/CPO1 85/5/10 | PET/T | 373 | 2.9 | — | 115 | — |
| 26 | IBMA/ACM/CPO1 85/5/10 | PET/T | A341 | 4.1 | — | 1 | — |

TABLE 9

Effect of Ink Type Using M316 Test Tape

| Ex. | Composition | Film Type | PVC Ink Initial | PVC Ink Aged | PP Ink Initial | PP Ink Aged | Water-based Ink Initial | Water-based Ink Aged |
|---|---|---|---|---|---|---|---|---|
| 27 | IBMA/ACM/CPO1 85/5/10 | BOPP/F | E | E | E | E | VG | VG |
| 28 | IBMA/ACM/CPO2/S1 84.8/5/10/0.2 | BOPP/F | E | E | E | E | VG | VG |

TABLE 9-continued

| | | Effect of Ink Type Using M316 Test Tape | | | | | |
|---|---|---|---|---|---|---|---|
| | | Film | PVC Ink | | PP Ink | | Water-based Ink | |
| Ex. | Composition | Type | Initial | Aged | Initial | Aged | Initial | Aged |
| C3 | Monta 6893 PVC Tape | PVC | E | E | E | E | G | G |

We claim:

1. A directly printable film comprising polymeric substrate having first and second major surfaces and a layer of directly printable release coating on at least one of the first and second major surfaces which release coating comprises the reaction product of
   (i) from 50 to 95 weight percent of a vinyl functional monomer comprising the acrylic and methacrylic acid esters of a non-tertiary alcohol containing from 1 to 14 carbon atoms;
   (ii) from 5 to 50 weight percent of a chlorinated olefinic resin;
   (iii) from 0 to 30 weight percent of an amide-functional monomer;
   (iv) from 0.01 to 5 weight percent of a free radically polymerizable siloxane-containing component containing

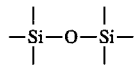

units.

2. A directly printable film according to claim 1 wherein
   component (i) is selected from the group consisting of methyl acrylate and methacrylate, isobutyl acrylate and methacrylate, isooctyl methacrylate, isobornyl acrylate and methacrylate, isononyl acrylate and methacrylate, 2-ethylhexylmethacrylate, dodecyl acrylate and methacrylate, n-butyl acrylate and methacrylate, and hexyl acrylate and methacrylate,
   component (ii) is selected from the group consisting of chlorinated polyethylene, chlorinated polybutylene, chlorinated polypropylene,
   component (iii) is selected from the group consisting of acrylamide, methacrylamide, and N,N-dimethyl acrylamide.

3. A directly printable film according to claim 1 wherein the directly printable release coating comprises the reaction product of
   from 70 to 90 weight percent of component (i),
   from 10 to 30 weight percent of component (ii),
   from 5 to 10 weight percent of component (iii), and
   from 0.1 to 0.5 weight percent of component (iv).

4. A film according to claim 1 wherein said directly printable coating comprises the reaction product of said components (i), (ii), (iii) and (iv) a free radically polymerizable siloxane-containing material.

5. A film according to claim 1 wherein said directly printable coating comprises the reaction product of components (i), (ii) and (iv).

6. A printed article comprising a film according to claim 1 wherein said coating has been printed with indicia.

7. A directly printable film prepared by combining (i) from 50 to 95 weight percent of a vinyl-functional monomer that comprises an acrylic or methacrylic acid ester of an alcohol, (ii) from 5 to 50 weight percent of a chlorinated olefinic resin, (iii) from 0 to 30 weight percent of an amine-functional monomer and, (iv) from 0.05 to 2 parts by weight of a free radically polymerizable siloxane-containing material in a suitable reaction medium, and reacting the components to form a polymer, and applying the polymer to a polymeric substrate.

8. A directly printable pressure sensitive adhesive tape comprising a polymeric substrate having first and second major surfaces, a layer of a pressure sensitive adhesive on the first major surface of the polymeric substrate, and a layer of a directly printable release coating on the second major surface of the polymeric substrate wherein the directly printable release coating comprises the reaction product of
   (i) from 50 to 95 weight percent of a vinyl functional monomer comprising the acrylic and methacrylic acid esters of a non-tertiary alcohol containing from 1 to 14 carbon atoms;
   (ii) from 5 to 50 weight percent of a chlorinated olefinic resin;
   (iii) from 0 to 30 weight percent of an amide-functional monomer;
   (iv) from 0.01 to 5 weight percent of a free radically polymerizable siloxane-containing component containing

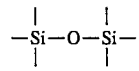

units.

9. A pressure sensitive adhesive tape according to claim 8 wherein the directly printable coating comprises from 70 to 90 weight percent of component (i), from 5 to 20 weight percent of component (ii), from 2 to 10 weight percent of component (iii) and from 0.1 to 0.5 weight percent of component (iv).

10. A pressure sensitive adhesive tape according to claim 9 wherein the substrate is selected from the group consisting of oriented and unoriented polyolefins, polyesters, polyamides, and polyimides.

11. A pressure sensitive adhesive tape according to claim 10 wherein the pressure sensitive adhesive is polyacrylate; polyvinyl ether; diene-containing rubber; polychloroprene; butyl rubber; butadiene-acrylonitrile polymer; thermoplastic elastomer; block copolymers of styrene-isoprene and styrene-isoprene-styrene; ethylene-propylene-diene polymers, and styrene-butadiene polymer; poly-alpha-olefin; amorphous polyolefin; silicone; ethylene-containing copolymer; polyurethane; polyamide; epoxy; polyvinylpyrrolidone and vinylpyrrolidone copolymers; and polyesters;

12. A low noise directly printable pressure sensitive adhesive tape according to claim 8.

* * * * *

UNITED STATES PATENT AND TRADEMARK OFFICE
CERTIFICATE OF CORRECTION

PATENT NO.: 5496635
DATED: March 5, 1996
INVENTOR(S): Robert C. Francis, Robert R. L. Molders, William G. Walsh, and Ramesh C. Kumar It is certified that error appears in the above-identified patent and that said Letters Patent is hereby corrected as shown below:

Col. 13, Line 12, insert -- a -- before "polymeric"

Col. 13, Line 13, insert -- opposite -- after "second"

Col. 13, Line 40, insert -- decyl acrylate and methacrylate, -- before "dodecyl acrylate"

Col. 14, Line 14, "0.05" should be -- 0.01 --.

Signed and Sealed this

Eighteenth Day of May, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,496,635
APPLICATION NO. : 08/204001
DATED : March 5, 1996
INVENTOR(S) : Robert C. Francis et al.

It is certified that error appears in the above-identified patent and that said Letters Patent is hereby corrected as shown below:

Col. 13, Line 12, insert -- a -- before "polymeric"

Col. 13, Line 13, insert -- opposite -- after "second"

Col. 13, Line 40, insert -- decyl acrylate and methacrylate, -- before "dodecyl acrylate"

Col. 14, Line 14, "0.05" should be -- 0.01 --.

Signed and Sealed this

Second Day of October, 2007

JON W. DUDAS
*Director of the United States Patent and Trademark Office*